Nov. 25, 1969     A. DUERKSEN     3,480,295
REVERSIBLE TRAILER TRAIN CONSTRUCTION
Filed Aug. 8, 1967     2 Sheets-Sheet 1
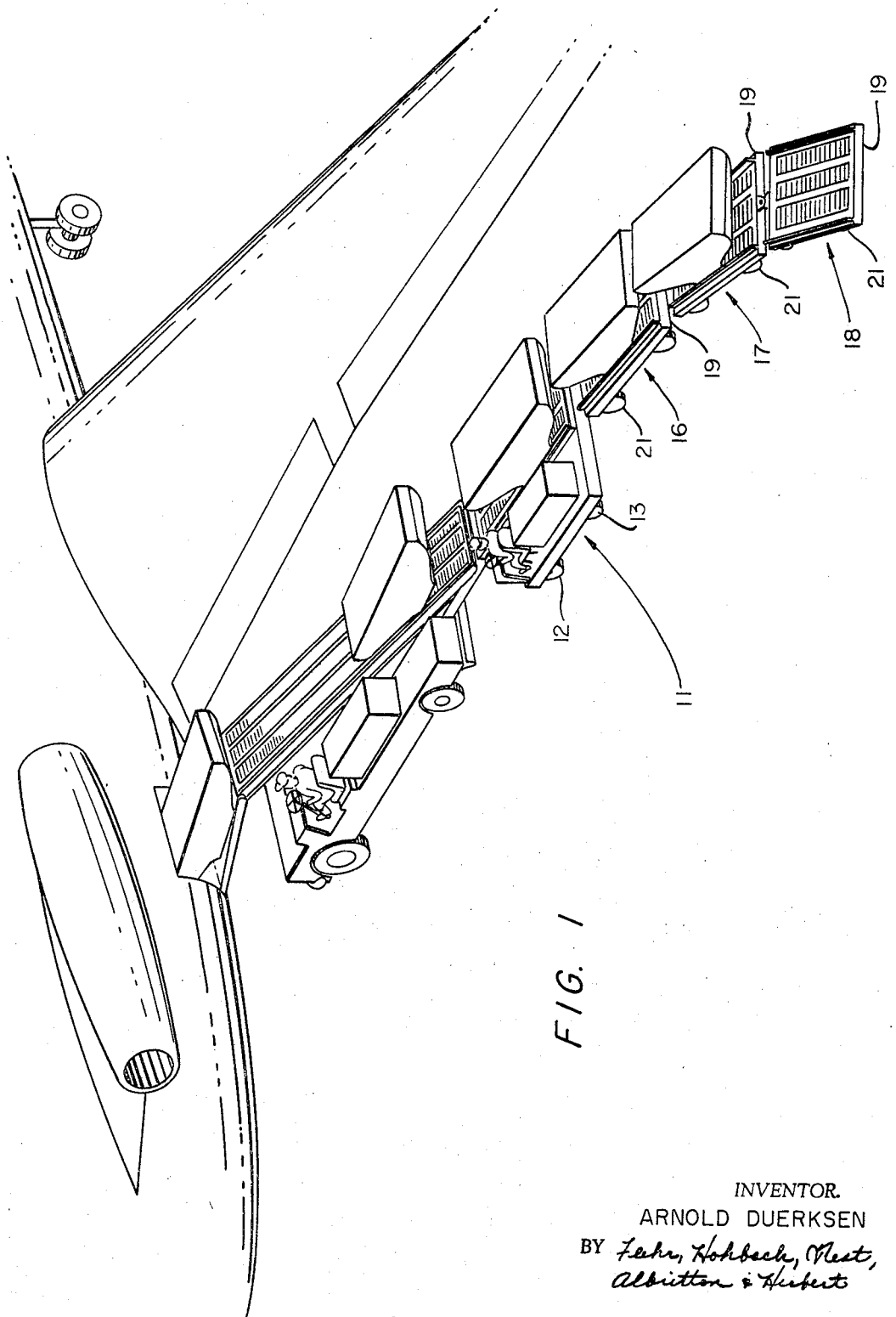
INVENTOR.
ARNOLD DUERKSEN
BY *Fehr, Hohbach, Mest,*
*Albritton & Hubert*
ATTORNEYS

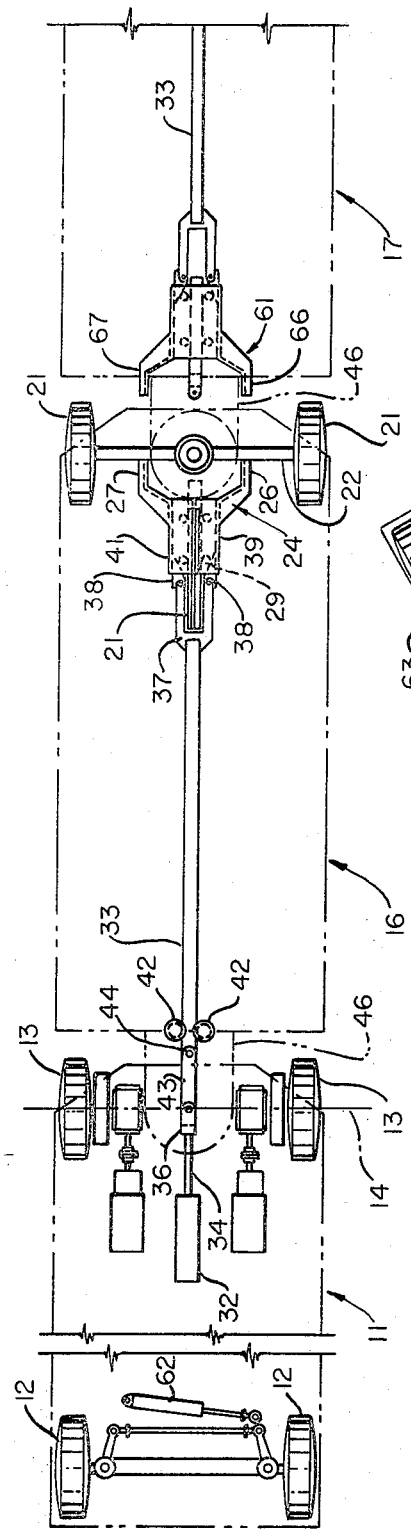

United States Patent Office 3,480,295
Patented Nov. 25, 1969

3,480,295
REVERSIBLE TRAILER TRAIN CONSTRUCTION
Arnold Duerksen, Salinas, Calif., assignor, by mesne assignments, to Cochran Western Corporation, Salinas, Calif., a corporation of California
Filed Aug. 8, 1967, Ser. No. 659,052
Int. Cl. B60d 1/00; B62d 53/00, 13/06
U.S. Cl. 280—408                                          6 Claims

ABSTRACT OF THE DISCLOSURE

A trailer construction of a type adapted to form a train of trailers is arranged whereby the train of trailers can be driven in each of two opposite directions. A pivotable axle supports the chassis of the trailer vehicle. A shiftable fork is operable from the tractor pulling the trailer and is arranged to engage or release the pivotable axle. When the axle is released for pivotable movement with respect to its chassis, another fork is moved into position to engage the axle so as to preclude pivoting of the axle with respect to another chassis coupled in tandem with the first chassis. A pair of steerable wheels support the trailing end of the last trailer chassis of the train.

---

This invention pertains to vehicle constructions and more particularly to a vehicle construction providing trailers coupled in tandem and arranged for operation in either one or the other of two opposite directions of travel.

As is well known, when a trailer vehicle is drawn by a tug or tractor in a forward direction, the trailer vehicle will trail behind the tractor taking its guidance from the direction of the tractor. On the other hand, when a tractor and trailer construction is backed up or operated in a reverse direction, the driver of the tractor must be particularly careful to guard against jack-knifing the rig.

Where a train of trailers is formed from a number of individual trailers, all coupled in tandem and drawn by a tractor, the problem of jack-knifing is compounded significantly whenever the train of trailers is to be operated in a reverse direction.

The capability of being able to operate a train of trailers in opposite directions is particularly significant in applications, such as in and around an airport baggage loading operation. As is known, baggage is loaded on a number of individual small trailer units and the entire train of trailers is then drawn out to the airplane in the region of the baggage compartment of the aircraft. Having drawn the train of trailers up to the aircraft, it may become difficult to back the trailer train away from the aircraft and to otherwise maneuver the trailer train in close surroundings.

Another problem in the above circumstances is to be found in the fact that, customarily, in most trailers, only one of the axles is steerable while the other axle, ordinarily at the rear of the trailer, is fixed in place to provide stability at that end of the vehicle.

In general, it is an object of the present invention to provide an improved trailer vehicle construction of the above type.

It is another object of the invention to provide a trailer train of vehicles capable of being readily operated in a forward and reverse direction of travel.

It is yet another object of the invention to provide a trailer train of vehicles of improved construction whereby the train of trailers can be guided from either end by steerable wheels located at each end.

These and other objects of the invention will be more readily apparent from the following detailed description of a preferred embodiment when considered in conjunction with the drawings, in which:

FIGURE 1 is a perspective view of a train of trailers positioned for loading operations with respect to an aircraft;

FIGURE 2 is a plan view of trailers, viewed from beneath, showing the condition of the apparatus for moving leftward (as shown);

FIGURE 3 is a plan view, viewed from beneath, showing a portion at the right hand end of the train of trailers conditioned to move to the right (as shown);

FIGURE 4 is an elevation detail view, partially broken away, taken along the line 4—4 of FIGURE 2.

In general, a vehicle of the above type has been provided comprising an elongated chassis, an axle at an end of the chassis and provided with wheels on the ends thereof to support the axle and the chassis from the ground. The axle is arranged to be pivotable about an upright axis. In conjunction with the above, means carried by the chassis and shiftable between advanced and retracted positions serves to respectively hold and release the pivotable axle as respects such pivoting movement while being adapted contemporaneously therewith to respectively release and hold another axle, similarly pivotable, of an adjacent vehicle coupled in tandem to the chassis.

The means for holding and releasing the one axle of the chassis conjointly with releasing and holding another serves, therefore, to effect the opposite condition for another axle of a tandemly coupled trailer vehicle adjacent one or the other of the ends of the vehicle carrying the axle.

Referring to the drawing, there is shown a train of trailer vehicles, which train includes a tug vehicle or tractor 11 provided at its forward end with a pair of steerable wheels 12 and at its trailing end with a set of wheels 13 mounted on the end of a fixed axle (not shown) but represented by the phantom line 14.

In general, immediately following the tug vehicle 11 and coupled in tandem one to the next is a series of trailer vehicles 16, 17 and 18. Each of vehicles 16 and 17 includes a chassis 19 which also serves as a platform for supporting a load.

Chassis 19 is supported from the ground by means of wheels 21 carried on the ends of a pivotable axle 22 which is adapted to pivot about the upright axis 23.

As will be readily apparent, when the train of vehicles is moving in a forward direction as depicted in the drawings by moving to the left, axle 22 of trailer 16 must be held in a substantially fixed position extending transversely substantially normal to the train's path of movement, as defined, for example, by the wheels 13. Under such conditions, it is apparent that axle 22 should normally not pivot about axis 23 relative to its associated chassis 19 since the wheels 21 will, under such conditions, constitute the trailing wheels of trailer 16 and of trailer 17.

On the other hand, when the train of trailers is being driven to the right (as shown in the drawings) axle 22 should be permitted to pivot relative to its associated trailer 16 since the wheels 21 of trailer 16 will constitute the lead wheels of the trailer 16. However, means have been provided whereby wheels 21 of trailer 16 serve at the same time to support the trailing end of trailer 17 in a manner whereby axle 22 will not pivot relative to trailer 17.

Having in mind the foregoing general concept of operation, means have been provided which selectively serve in a first condition to move one of the axles to a predetermined disposition extending transversely of its associated chassis and to hold that axle at such disposition while at the same time releasing an axle of an adjacent tandemly coupled trailer vehicle. Further, the means referred to above is operable in another condition upon termination of the first condition in order to reverse the relationship.

Accordingly, beneath the chassis 19 of trailers 16, 17 and 18 an axle positioning bracket or yoke assembly 24 of a box-like construction forms a pair of arms 26, 27 whereby their ends engage axle 22 when yoke assembly 24 has been moved to its advanced position.

Yoke assembly 24 is movable between an advanced and retracted position inasmuch as it is slidably mounted on a guide-bar 28 engaged by four flanged rollers 29. The flanges 31 of rollers 29 engage the upper and lower surfaces of guidebar 28.

Means for moving arms 26, 27 between retracted and advanced positions includes the hydraulic ram 32 carried, for example, by the tractor vehicle 11 and operable by the driver of vehicle 11. Ram 32 is connected to move the connecting link 33. While the leading end of link 33 is pivotally coupled via link 43 to the piston rod 34 of hydraulic ram 32 as, for example, by means of the clevis 36, and the pivot point 44. The other end of rod 33 carriers a fork 37. The tips of fork 37 are secured to triangular plates 38 secured, as by welding, to the side plates 39, 41 of the box-like central portion of assembly 24. Near the leading end of trailer 16, rod 33 is guided by means of the roller guides 42 to retain it along the center line of the chassis.

Trailers 16, 17 are each provided with a coupling tongue 46 formed fixed to chassis 19. Tongues 46 serve to cooperate in providing a "fifth wheel" connection with the end of an adjacent trailer (or the tractor vehicle 11).

Thus, for example, the trailing end of trailer 16 has been provided with a fifth wheel support post 48 onto which the undersurface of tongue 46 rests and to which tongue 46 is coupled.

Means serving to couple tongue 46 to the trailing end of chassis 19 comprises the fifth wheel support post 48 and the relatively large kingpin or coupling bolt 49. Bolt 49 is readily dropped downwardly through the opening 51 of chassis 19, through an opening 52 formed in tongue 46 and thence into the hollow interior of post 48. Within the hollow interior of post 48 a bushing 53 receives kingpin 49 to form a journalled pivotable connection between trailers 16 and 17.

The train of trailers referred to above is arranged whereby even though the train is disposed in a serpentine fashion the axles 22 can be engaged by arms 26, 27 to be straightened by hydraulic ram 32 which can move the axles 22 to a position essentially normal to the centerline of that chassis with which they are associated.

Thus, ram 32 acts along connecting rods 33 from one trailer to the next. Interconnection is formed by connecting links 54 coupled at their ends by pins 56, 57 to form pivotal connections with respect to extension portions 58 secured rigidly to the underside of the axle positioning yoke assemblies 24.

It will be readily apparent, however, that prior to forming the kingpin connection by insertion of pin 49 into opening 52, it will be necessary to install pin 56. If desired, pin 57 may be permanently secured in place so as to retain connecting link 54 to the fixed extension portion 58.

An axle positioning yoke assembly 61, similar to assembly 24, is carried on the opposite end of connecting rod 33. Thus, as respects trailer 17, each end of rod 33 is provided with an axle positioning yoke assembly. It will be readily apparent, that the two yoke assemblies 61, 24 of trailer 17 are arranged whereby when one yoke assembly engages an axle the other assembly releases its associated axle. Thus, by moving connecting rod 33 between advanced and retracted positions, one axle will be released while the other axle is held or restrained from pivotal movement. Upon reversing the condition of rod 33 the reverse condition will be established relative to the two axles.

It will be further noted that both of the adjacent ends of the tandemly coupled trailers are supported by a single axle construction in the preferred arrangement shown in the drawings.

During forward movement of the train of trailers, the train is guided by means of the steerable wheels 12 operated by means, for example, of the hydraulic power steering unit 62 which is suitably responsive to steering mechanism of vehicle 11. When the train is driven in a reverse direction, the power steering unit 62 may be de-energized by suitable means whereby wheels 12 trail in a fixed position oriented along the path followed by tractor 11 while steering is accomplished by means of the steerable wheels 63 and a power steering actuator unit 64 located on the (now) leading end of trailer vehicle 18.

In operation, a train of trailers proceeds as follows. Hydraulic ram 32 is operated to move all of the rods 33 simultaneously to an advanced position, i.e. fully to the right as shown in the drawings whereby arms 26, 27 engage and hold an axle 22 associated with the trailing end of each trailer 16, 17.

In the event that the train of trailer units is oriented in a serpentine fashion, ram 32 has sufficient power so as to straighten out the axles 22 to dispose them substantially normal to the centerline of their chassis. Power steering unit 64 is neutralized by suitable known means whereby wheels 63 trail along a straight path beneath the chassis 18.

It will be readily apparent that in a forward mode of operation, axles 22 will pivot about their respective axes 23 relative to the movements of the next adjacent following tongue 46, i.e. the chassis 19 of that vehicle tandemly coupled immediately to the rear of the pivot axis 23. At the same time, however, it is apparent that axle 22 is being restrained from pivoting relative to the chassis of its own trailer vehicle.

Upon reversing the condition of rods 33, it will be readily apparent that axle 22 will again be engaged by arms 66, 67 of assembly 61, for example, which has then been slidably moved forward to the point where a pivot connection formed by pin 57 coincides with axis 23 so as to permit axle 22 to pivot about axis 23. However, in this instance, such pivoting movement is performed relative to the chassis of its own trailer vehicle 16 while it is restrained from pivoting relative to the chassis of the adjacent tandemly coupled vehicle 17.

From the foregoing, it will be apparent that the stable trailing characteristic which is associated with forward operation of conventional trailers having fixed rear axles has been imparted to the train of tandemly coupled vehicles for operation in both a forward and a reverse direction.

Further, the above capability can be established without prior maneuvering of the train into a straight column before shifting rods 33.

In addition, by the above arrangement, a single axle can readily support the two adjacent ends of each pair of trailers so as to minimize the expense of construction.

What is claimed is:

1. In tandem coupled vehicular apparatus the improvement comprising first and second elongated chassis coupled in tandem, a first axle adapted to be supported by wheels, said axle being disposed at an end of the first chassis and serving to support both said end and the adjacent end of said second chassis, said axle being pivotable about an upright axis, a second axle similarly pivotable relative to said second chassis and means carried by said second chassis shiftable to respectively hold and release said first axle as respects such pivoting at the first named said end and, conjointly therewith, serving to respectively release and hold said second axle at the remote end of said second chassis.

2. In tandem coupled vehicular apparatus the improvement comprising a first and second elongated chassis, a first axle adapted to be supported by wheels, said axle being disposed at an end of the first chassis and serving to support said end, said axle being pivotable about an upright axis, a second axle similarly pivotable relative to said second chassis and at an end thereof remote from the first named said end, and means carried by said second chassis shiftable to respectively hold and release said first axle as respects such pivoting at the first named said end and, conjointly therewith, serving to respectively release and hold said second axle at the remote end of said second chassis, said operating means selectively serving in a first condition to move said first axle to a predetermined disposition extending transversely of said chassis and to hold same thereat while serving to release said second axle, and operable in a second condition to move said second axle to a predetermined disposition extending transversely of said chassis and to hold same thereat while releasing said first axle.

3. In a pair of vehicles each including a chassis of a type adapted to be rollably supported, an axle disposed transversely of and carried by a first of said chassis and pivotable about an upright axis, wheels on the ends of said axle, means serving to couple a second of said chassis in tandem with said first chassis, said second chassis also being supported by said axle, and means carried by one of said two chassis and operable in one condition to restrain said axle as respects said pivoting movement relative to said first chassis while permitting said pivoting movement relative to said second chassis and further operable in a second condition to restrain said axle as respects said pivoting movement relative to said second chassis while permitting said pivoting movement relative to said first chassis.

4. In a vehicle construction according to claim 3 wherein the last named means further serves, when restraining said axle, to move said axle to a disposition substantially normal to the path of said vehicles to align said wheels to travel said path.

5. In a train of tandemly coupled trailer vehicles adapted to be drawn by a tractor vehicle, each trailer including a chassis, an axle for supporting an end of the chassis and pivotable about an upright axis with respect to one and the other of the tandemly coupled adjacent ends of each pair of coupled trailer vehicles, and means for restraining the axles from pivoting with respect to all said ones or all said others of the adjacent ends of each said pair of trailer vehicles, said means further serving to pivot said axles to dispose same to extend transversely substantially normal to all said ones or all said others of the adjacent ends of each said pair of trailer vehicles.

6. For a pair of vehicles mutually coupled at adjacent ends for forward or reverse movement the improvement comprising a transversely extending axle, means carried by one of said vehicles disposing said axle for pivoting movement about an upright axis relative to one of said ends while being restrained relative to the other of said ends, and means carried by said one of said vehicles for cooperating with said axle and serving to reverse the relationship to dispose said axle to pivot about an upright axis relative to said other of said ends while being restrained relative to said one of said ends, both said upright axes being coaxially disposed to lie on substantially the same axis of rotation, said axis of rotation being fixed relative to said one end.

References Cited

UNITED STATES PATENTS

| | | | |
|---|---|---|---|
| 1,236,738 | 8/1917 | Mitchell | 280—108 |
| 2,532,151 | 11/1950 | Dibert et al. | |
| 2,714,017 | 7/1955 | Mendez | 280—432 |
| 3,151,880 | 10/1964 | Black | 280—408 |
| 3,151,881 | 10/1964 | Walther | 280—408 |
| 3,290,058 | 12/1966 | Ellerd | 280—410 |

LEO FRIAGLIA, Primary Examiner

U.S. Cl. X.R.

280—432, 448